United States Patent [19]

Muth

[11] 4,430,607
[45] Feb. 7, 1984

[54] CIRCUIT ARRANGEMENT

[76] Inventor: Wolfgang Muth, Erich-Ollenhauerstrasse 50B, 6200 Wiesbaden, Fed. Rep. of Germany

[21] Appl. No.: 379,454

[22] Filed: May 18, 1982

[30] Foreign Application Priority Data

May 18, 1981 [DE] Fed. Rep. of Germany ....... 3120141

[51] Int. Cl.³ ............................................. G05F 1/70
[52] U.S. Cl. .................................... 323/217; 318/729
[58] Field of Search ............... 318/729; 323/217, 237, 323/239

Primary Examiner—William M. Shoop
Attorney, Agent, or Firm—Basile, Weintraub & Hanlon

[57] ABSTRACT

It is known that every single or multi-phase power consumer such as a motor is optimally designed only for a certain power take up. Other power take ups deviating from this value result in a decreased ratio between power output and current intake. The circuit arrangement described in this application facilitates a fully automatic regulation and thus immediate adjustment of the respective power consumption to the respective power demand so that a motor or similar power consumers can be operated under energetically optimum conditions even under partial load. As a function hereof an advantageous phase detection facilitates generation of a regulated voltage with the current intake being reduced with increasing phase shift resulting in an increase of the output factor. For this purpose a Triac in series with the power consumer in the network is triggered in a certain manner in multiplex operation and a circuit differentiation is made among several phase controls.

5 Claims, 4 Drawing Figures

CIRCUIT ARRANGEMENT

BACKGROUND OF THE INVENTION

1. Field of the Invention

The invention concerns circuit arrangements for automatically adjusting the power intake of a power consumer.

2. Description of the Prior Art

Every single or multi-phase power consumer be it a motor, a transformer, a condensor circuit, or other applications causes—due to the capacitive or inductive load design as a function of the required output—a phase shift between the current and the voltage source. The resultant resistance reduces the effectiveness that is the output consumption characteristics of the power consumer device. This can result in considerable energy losses. Thus, for instance, phase angle controls for alternating current transformers are subject to specific regulations which permit switching high performance transformers into the network only under certain conditions.

For shifting the phase angle in a phase control unit depending upon the extent of the phase shift between voltage and current, thrystor and triac circuits are known where the respective desired ignition angle can be facilitated manually by changing a potentiometer or is limited by so called terminal switches which can be switched by temperature probes, photo transistors, pressure probes or similar devices.

These known circuits and methods for regulating phase angle controlled alternating current consumers have the draw back that they are not capable of implementing optimum adjustment of the respective momentary power consumption, that is, the actual value of the power consumer relative to the respective output requirement.

Thus it is generally known with respect to electrical motors that they are rarely operated under full load and are usually operated under partial load for a large period of time of service life only. During this type of operation the ratio of phase shift between current and voltage deteriorates down to the extreme case of idling of the motor in which the phase shift is nearly 90°.

The purpose of this invention is to improve a circuit arrangement in such a manner that a fully automatic regulation dependent upon the extent of phase shift is facilitated by direct detection of this phase shift and obtaining a regulating voltage which is proportional therewith so that a considerable reduction of the power consumption during the operating period independent of the momentary load is to be achieved by optimum adjustment of power consumption and power demand.

For the first time the circuit arrangement according to this invention facilitates complete phase detection in a particularly simple manner by generating an automatic regulating voltage as a function of the size of the phase shift between the voltage and current in single and multi-phase power consumers and causes an automatic reduction in the power consumption for alternating current consumers and, particularly, induction motors which was previously not possible in such as universally applicable simple form. In addition to inductive load consumers, capacitive consumers may also be taken into consideration.

It becomes possible to automatically adjust the phase control which guarantees momentary adjustment of the respective power consumption to the respective momentary power demand which, for electrical motors, is synonymous with the fact that they can be operated under optimum conditions in every partial load range with the respective minimum possible and optimum required consumption.

BRIEF DESCRIPTION OF THE DRAWINGS

The attached drawings show an example for an advantageous circuit arrangement by way of which the invention is to be explained in greater detail.

DESCRIPTION OF THE PREFERRED EMBODIMENTS

With the circuit arrangment according to FIG. 1, which will be explained in greater detail below, different phase measurements and the creation of a regulated voltage as a function of the detected phase shift are possible. The circuit is basically applicable for advancing as well as lagging phase shifts, that is, inductive as well as capacitive consumers, for instance, inductive consumers for an induction motor and for inversion of the phase that is, turning the phase by 180° correspondingly for a series wound motor, but also for a three phase motor,. In this case the phase detection, the regulated voltage generation, as well as the switching off of the current for every individual phase must be implemented separately but in a synchronized manner by way of one circuit each as shown in FIG. 1.

Figure 1:
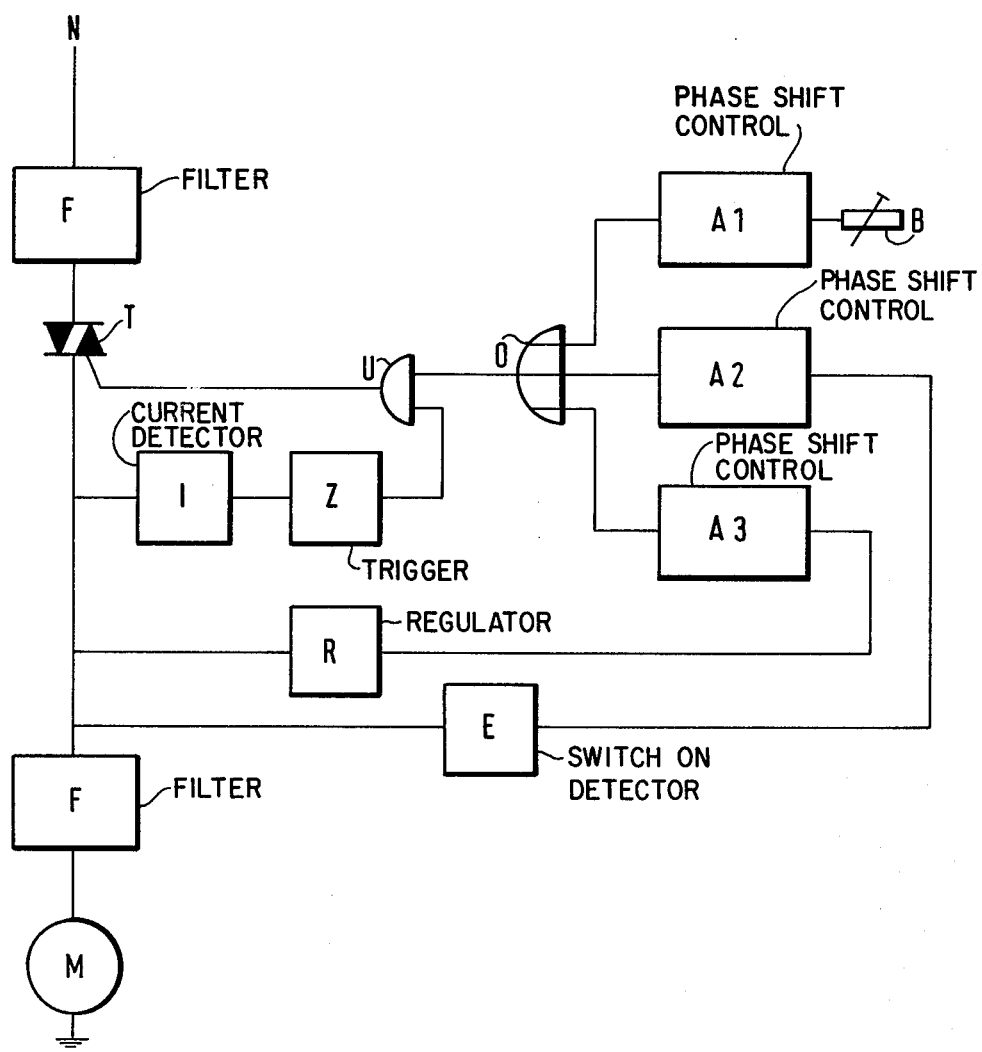
FIG. 1 shows a block wiring diagram of the circuit arrangement according to the invention.

By way of example the block wiring diagram according to FIG. 1 shows an induction motor as a power consumer M in an AC network between the zero pole and the connecting terminal N in series with a triac T and interference filters F. The control electrode of the triac T is connected to the output of a AND gate, the two inputs of which on the one hand are connected to the output of an OR gate O and on the other hand to a trigger stage Z which, in turn, is switched in series with a current detector I, the function of which will be explained at a later point.

The three inputs of OR gate O are connected to phase control units A1, A2, and A3 respectively. The input of the first phase control unit A1 is connected to an adjustable resistance, that is a Trimmer B, the second connection of which—not shown—is connected to the supply voltage. The junction between the power consumer M and the triac T is connected to the input of the second phase control A2 via a switch on detector E. Also, the junction between the power consumer M and the triac T is connected to the third phase control A3 through a regulating circuit R and to the input of AND gate U through current detector I and a trigger circuit Z.

Figure 2:
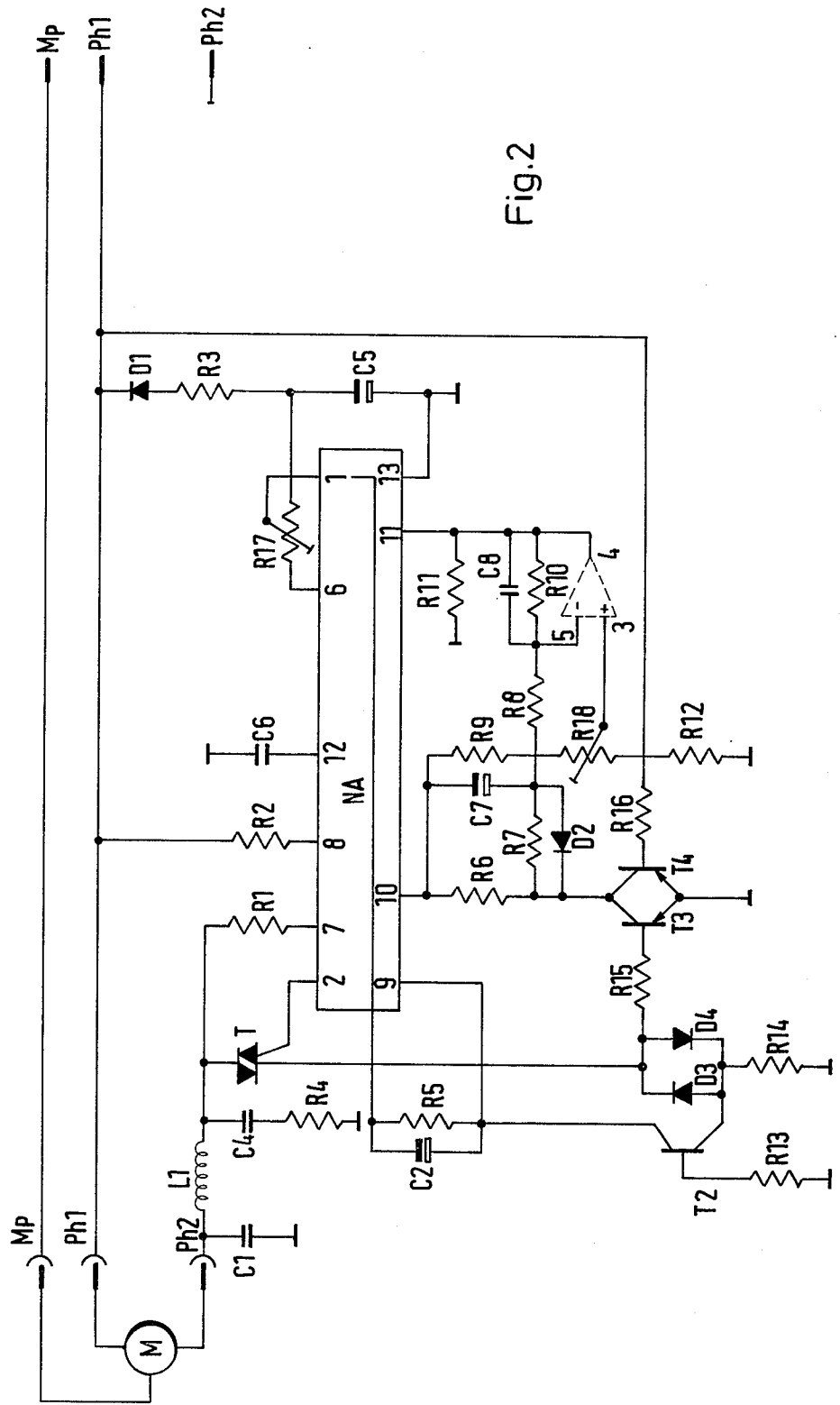
FIG. 2 is a detailed illustration of the circuit diagram corresponding with the block wiring diagram according to FIG. 1.

The induction motor to be regulated as power consumer M in the example according to FIGS. 1 and 2 is known to have the characteristic that the phase shift between voltage and power caused by its inductivity decreases from idling of the motor to full load such that the desired maximum efficiency of the induction motor exists only when the motor runs under full load. In practice such motors are generally operated at an intermediate value between idling and full load thus causing a phase shift and a reduction of the performance factor cost $p$ as a function of the phase shift. The present circuit arrangement regulates the phase angle in such a manner that a corresponding counter regulation takes place with increasing phase shift. The power consumption of the induction motor particularly in the idle position but also graduated when operated under partial load is reduced from 0 to 25% depending upon the motor.

The three phase control units A1 through A3 control the triac T via the OR gate O in each case during the first half wave. Given a large phase shift, that is, approximately when the motor idles control is facilitated via phase control unit A1. The maximum phase angle is given by setting trimmer B.

With decreasing phase shift, that is, increasing load on the induction motor, the phase angle is reduced by phase control unit A3 via the regulating circuit R until phase control is implemented at the zero current crossover. Phase control unit A2 together with the switch on detector E represents a safety circuit which insures that the induction motor is operated without phase control when switched on, that is, during the period that the motor is brought up to speed. Also, including the idling position, this means that then the ignition of triac T takes place again at the zero crossover of the current.

Current detector I together with the trigger stage Z also serve as a safety circuit. In order to avoid overload the peak current is measured by way of current detector I and, upon exceeding a predetermined permissible maximum value, the trigger stage Z which is formed as a monostable sweep circuit interrupts the ignition of triac T for the adjustable sweep time of the mono-vibrator as a result of the illustrated AND circuit. If an overload persists after the mono-stable sweep stage has returned to its stable initial status the sweep stage may be triggered again repeatedly so that the non-permissible maximum current can flow through Triac T for only a very brief time segments which results in a safe avoidance of the dangers caused by an overload.

To facilitate an understanding of the circuit diagram according to FIG. 2 in view of the block illustration of FIG. 1 it must basically be assumed that the IC-building Block NA in FIG. 2 which serves as a network adaptor corresponds with the three phase control units A1 through A3 together with the OR-gate O and the AND-gate U, trigger staage Z and operational amplifier. According to FIG. 2 the interference filter F of FIG. 1 is synonymous with circuit L1, C1 and current detector I according to the wiring diagram of FIG. 2 is composed of transistor T2, two diodes D3, D4 and two resistors R13 and R14. The connecting line N (FIG. 1) leading in from the mains is shown in FIG. 2 by line Ph 1.

The IC-building block NA in FIG. 2 is commercially available and is part of the current state of the art being fed via power supply D1, R3, C5 to connections 1 and 13. The adjustable resistor R 17 between connections 1 and 6 of building block NA corresponds with trimmer B in FIG. 1. Connection 6 of building block NA is the output of the first phase control A1 to the OR-gate O in FIG. 1. Connection 10 supplies a reference voltage to increase the regulated voltage. Resistor R2 at connection 8 of Building block NA facilitates synchronization of the phase control with a zero crossover of the voltage and resistor R1 at connection 7 facilitates synchronization via the current.

In addition to the adjustable resistor R 17, condensor C 6 at connection 12 of the IC-building block NA serves for the mentioned limitation of the adjustable maximum phase angle. Concerning the details of the circuit diagrams and the wiring of the individual construction elements reference is made to the illustration in FIG. 2.

The control electrode of the triac T is connected to connection 2 of the building block NA which also includes the AND Gate U and avoids a so called overhead ignition of triac T by the in series switching of resistor R4 with condensor C4; while the interference filter L1, C1 avoids coupling of the interference radiation into the network and into the subsequent induction motor M.

As further indicated from the circuit diagram in FIG. 2, the current flowing through triac T is measured at the resistor R14 which is part of the power detector I (FIG. 1). If the voltage—as a result of the current flow-through the resistor exceeds the predetermined base emitter voltage of transistor T2, the base of which is located adjacent to resistor R13, transistor T2 changes over into its conductive state. As a result, the logical information value zero is available at connection 9 of the IC-building block NA which (compare also FIG. 1). results in control impulses at connection 2 of IC building block NA to the triac T being supplied by the AND-gate U. Over the entire period for which connection 9 has the logical information content zero no current will flow through Triac T. The period of time for which the triac T is blocked is defined by resistor R5 and condensor C2 corresponding with the monostable trigger stage Z in FIG. 1 with arc connected to the collector of transistor T2. The zero crossover of the alternating current phase is identified in the integrated circuit NA by the resistor R1 between connection 7 and the connection at triac T as illustrated.

Figure 3:
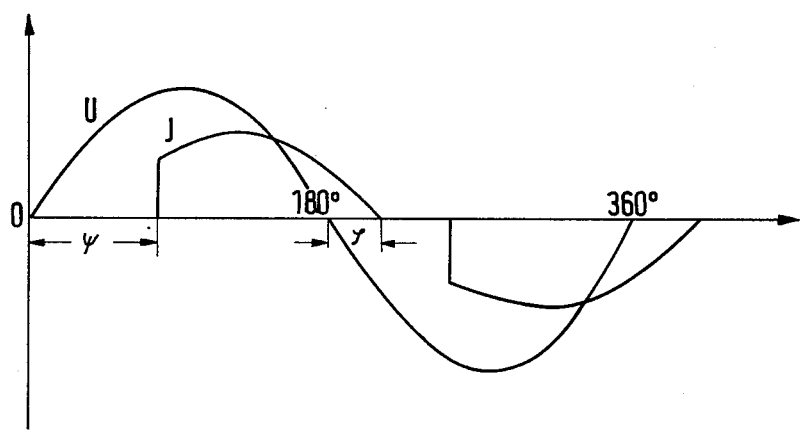
FIG. 3 shows the phase shift of power and voltage on the ordinate as a function of the phase above the abscissa in order to illustrate the relationship between phase shift and phase angle.

FIG. 3 shows a graphic illustration wherein in a cartesian coordinate system the current and/or the voltage (Y-Axis) is shown over time and/or phase (X-Axis). Accordingly the phase shift in the present case namely, when a phase angle of the current flow occurs, denotes the shifting of the voltage and current crossovers that is the amount shown in FIG. 3. The phase angle $p$ in the illustration is the maximum possible via adjustable phase angle trimmer B (FIG. 1), with this statement being valid in the first approximation when the phase angle $\psi$ is equal to or less than 90°. With a larger phase angle it is possible that the phase shift totally disappears since in that case a G-EMK no longer exists.

Figure 4:
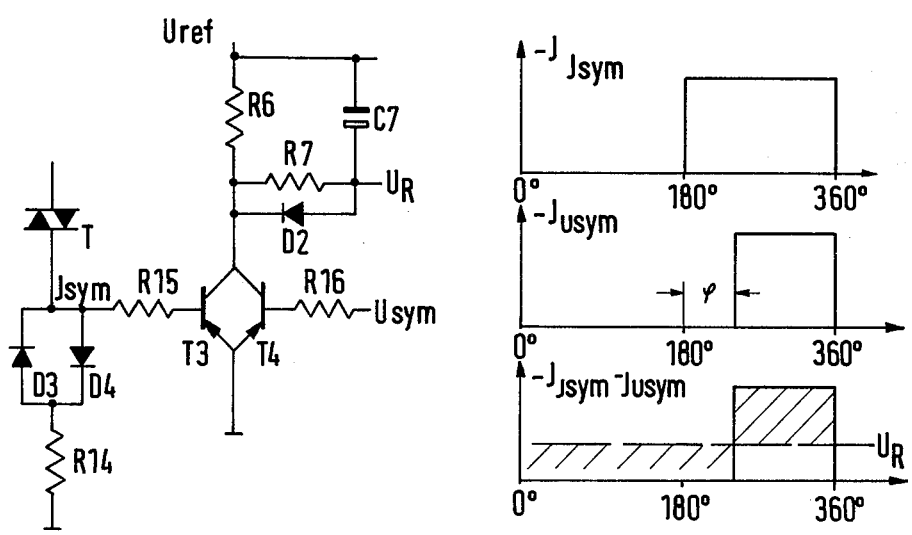
FIG. 4 represents an illustration to explain the dependency of the regulated voltage upon the phase shift.

The switch on detector E (FIG. 1) which represents part of the circuit diagram corresponding with FIG. 2 is again shown in FIG. 4 and consists primarily of condensor C7. Independent of the crossovers of the voltage and the current the switched two transistors T3 and T4 as is shown in the illustration make it possible that an impulse sequence can be derived with collector junction of the transistors determining the regulated voltage $U_R$ as illustrated.

With a phase shift of $p=0$, only the voltage impulse becomes effective and the regulated voltage results in $U_R = U_{ref}/2$.

From the integrated construction block NA, as is shown by the right side of the illustration in FIG. 4. The regulated voltage $U_R$ is a linear function of the phase shift.

Corresponding with FIG. 1 the switch on detector E on A2 is synonymous with connection 10 of the integrated building block NA in FIG. 2 where it consists of resistors R6 and R7, condensor C7 and diode D2.

In the wiring diagram according to FIG. 2 the regulating circuit R (FIG. 1) is primarily shown by resistors R8 to R12 and R18, condensor C9 and the operational amplifier, one input of which is located at the junction between resistors R8 and R10 and the other positive input at the center tap of the adjustable resistor R18 as well as resistors R15, R16 and transistors T3 and T4. In the shown version the amplification of the operating amplifier is adjusted via resistor R10 in such a manner that a phase shift of $\rho=0°$ to $60°$ at the output of the operational amplifier generates a voltage which can triger a phase angle of $\psi=0°$ to $90°$. Two prerequisites are of significance for setting the regulation, these are:

(1) The advance of the maximum phase limitation angle $\psi$ maximum must be so slight that the phase shift necessary for the regulation exists positively and vibration free in the form defined in FIG. 3. As stated above the adjustment is facilitated via trimmer R17 (B in FIG. 1); and (2) The comparison voltage of the non-inverted inlet of the operational amplifier is set in such a manner that the phase shift $\rho=0°$ to $60°$ triggers a phase angle of $\psi=0°$ to $90°$.

When the circuit arrangement switches on condensor C7 charges to detect the regulated voltage and facilitating a phase angle of Triac T at the zero crossover of the current.

If only consumer M is switched on this screen condensor is already charged. The charge voltage corresponds with phase shift $\rho=0$, since no current previously flowed so that the phase is controlled with a crossover of the current upon switching on the motor.

I claim:

1. A circuit arrangement for continuously adjusting the power intake to a load with respect to the power demand of the load comprising:
   a voltage control power switch connected in series with the load;
   means for detecting the instantaneous phase shift between the load current and voltage, the phase shift detecting means generating an output in proportion to the amount of the detected phase shifts;
   first phase shift control means, responsive to the output of the phase shift detecting means, for generating a control signal for controlling the phase angle of conduction of the power switch to reduce the load current upon increasing phase shift between the load current and voltage;
   switch on detector means for detecting a switch-on of the load, the switch-on detector means generating an output for a pre-determined period of time after the load is switched on;
   second phase shift control means, responsive to the output of the switch on detector menas, for generating a control signal suppressing conduction of the power switch for a pre-determined time after the switch-on of the load; and
   logic means, responsive to the control signals from the first and second phase shift control means, for generating an output control signal upon receiving an input from one of the first and second phase shift control means for controlling the phase angle of conduction of the power switch.

2. The circuit arrangement according to claim 1 characterized in that the voltage controlled power switch is a triac.

3. The circuit arrangement according to claim 1 or 2 further including:
   a third phase shift control means for generating a variably adjustable maximum value for the phase angle control of the power switch in response to large phase shifts between the load current and voltage.

4. The circuit arrangement according to claim 3 characterized in that the variably adjustable maximum value for the phase control is selected by way of an adjustable resistance.

5. The circuit arrangement according to claim 1 further including:
   AND gate having as one input the output of the logic means and an output connected to the power switch; and
   a serially connected current detector and a trigger means connected as another input to the AND gate for detecting current flow through the load and controlling the conduction of the power switch to prevent a load current of the predetermined maximum value.

* * * * *